(12) United States Patent
Fourney

(10) Patent No.: US 7,775,345 B2
(45) Date of Patent: Aug. 17, 2010

(54) CONVEYOR AND BELT WITH CLUTCH-DRIVEN FLIGHTS

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 202 days.

(21) Appl. No.: 12/057,126

(22) Filed: Mar. 27, 2008

(65) Prior Publication Data

US 2009/0242358 A1    Oct. 1, 2009

(51) Int. Cl.
*B65G 17/00*    (2006.01)
(52) U.S. Cl. .................. 198/779; 198/698; 198/697
(58) Field of Classification Search .......... 198/779, 198/698, 688.1, 690.2, 699.1, 697, 419.1, 198/459.6, 853, 732
See application file for complete search history.

(56) References Cited

U.S. PATENT DOCUMENTS

| | | | |
|---|---|---|---|
| 1,528,258 A * | 3/1925 | Michalik | .................... 198/732 |
| 3,329,255 A * | 7/1967 | Dulieu | ........................ 198/732 |
| 3,960,263 A * | 6/1976 | Isaksson et al. | ............. 198/718 |
| 4,421,224 A * | 12/1983 | Dingman | ............... 198/781.02 |
| 5,038,921 A | 8/1991 | Hoppmann et al. | |
| 6,318,544 B1 | 11/2001 | O'Connor et al. | |
| 6,390,285 B2 | 5/2002 | deGeus et al. | |
| 7,311,192 B2 | 12/2007 | Fourney | |
| 2006/0113166 A1 | 6/2006 | Wolkerstorfer | |
| 2007/0209909 A1 | 9/2007 | Fourney | |

* cited by examiner

*Primary Examiner*—Gene Crawford
*Assistant Examiner*—William R Harp
(74) *Attorney, Agent, or Firm*—James T. Cronvich

(57) ABSTRACT

A belt conveyor having clutch-driven flights for extremely low-torque operation. The flights have pivot members that rotate about an axis over a limited range of angles. A clutch mechanism includes a spring pushing a clutch wheel against a pivot member. The clutch wheel is arranged to rotate as the conveyor belt advances. Frictional contact between the rotating wheel and the pivot member imparts a moment on the flight to raise it to an extended position. When the flight is encumbered even by a light load, the low-torque mechanism automatically slips to prevent the flight from rising to the extended position.

28 Claims, 3 Drawing Sheets

CONVEYOR AND BELT WITH CLUTCH-DRIVEN FLIGHTS

BACKGROUND

The invention relates generally to power-driven conveyors and, more particularly, to modular belt conveyors having retractable flight members.

Many conveying applications require that conveyed articles be spaced apart on a conveyor belt. For example, merging two or more flows of articles into a single file without collisions is a common requirement. One conveyor used to accomplish this without slowing the belt or using complex sensors and external spacing bars is described in co-pending U.S. patent application Ser. No. 11/610,737, filed on Dec. 14, 2006, by the applicant of this application. The disclosure of that application is incorporated herein by reference. The conveyor includes a conveyor belt, belt rollers, and flights. Lower surfaces on the rollers engage a roller-engagement surface below the belt. Upper surfaces of the rollers define a plane above the belt. As the belt advances, the rollers roll on the roller-engagement surface and rotate to move an article supported on the rollers forward along the plane. The flights, which are spaced apart along the length of the belt, include cams that engage a cam surface below the belt to impart a moment on the flight and projections that respond to the moment by rotating from a retracted position to an extended position blocking the further advance of an article propelled forward. The cam-actuated flights, in conjunction with the article-accelerating rollers, cause conveyed articles to be staged at known locations on the belt for proper merging. The flights assume a retracted position as they return from the returnway before they encounter the cam surface. A conveyed article resting atop a retracted flight before it is raised to the extended position prevents the flight from popping up by cam action until the article is pushed clear of the flight by the rollers. Then the cam pops the unencumbered flight up to the extended position. When a flight is weighted down, its cam merely slides along the cam surface.

This device works well in most applications. But, in the case of lightweight articles, such as envelopes, for example, the cam-actuated flights have enough torque to rotate the retracted flight with a lightweight article atop it to the extended position. The lightweight article may be left stranded, leaning from the top of the flight without enough frictional contact with the belt rollers to clear the article from the flight. Consequently, the regular positioning of articles atop the belt for reliable merging or other applications requiring uniform product spacing is disrupted.

SUMMARY

This shortcoming is overcome by a conveyor embodying features of the invention. The conveyor comprises a conveyor belt arranged to advance in a direction of belt travel. A flight having a pivot member and a projection is coupled to the conveyor belt. The pivot member is rotatable over a limited angular range about an axis that is transverse to the direction of belt travel. The projection rotates from a retracted position generally parallel to the upper outer surface of the belt to an extended position upstanding from the upper outer surface by rotation of the pivot member. A clutch mechanism is mechanically coupled to the flight. The clutch mechanism rotates by contact with the engagement surface as the conveyor belt advances in the direction of belt travel. The rotation induces a moment on the flight about the axis. The moment is directed to rotate the projection about the axis from the retracted position to the extended position.

In another aspect of the invention, a conveyor belt embodying features of the invention comprises a flight rotatably coupled to the conveyor belt and a clutch mechanism rotatably coupled to the conveyor belt. As the clutch mechanism is rotated by contact with an engagement surface external to the belt as it advances in a direction of belt travel, a driving face of the rotating clutch mechanism biased in contact with a driven face of the flight rotates the flight from a first position to a second position.

In yet another aspect of the invention, a modular conveyor belt embodying features of the invention comprises a series of rows of belt modules linked end to end by hinge rods through interleaved hinge elements of consecutive rows into an endless belt. The belt has an outer surface and an opposite inner surface. Openings extend from the inner surface to the outer surface. One or more flights are rotatably attached to the modular conveyor belt in the openings. The flights are adapted to be rotated from a retracted position resting atop the outer surface of the belt to an extended position upstanding from the belt. One or more wheels are rotatably attached to the belt in the openings. Salient portions of the wheels extend from the opening past the inner surface of the belt. Pivot members on the flights have driven faces. The wheels have driving faces. The driving faces are biased against the driven faces to form a clutch that allows the driving faces of the wheel, when rotating, to apply a moment directed to rotate the flights from the retracted position to the extended position when the flights are unencumbered and to slip on the driven faces of the pivot members when the flights are encumbered.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
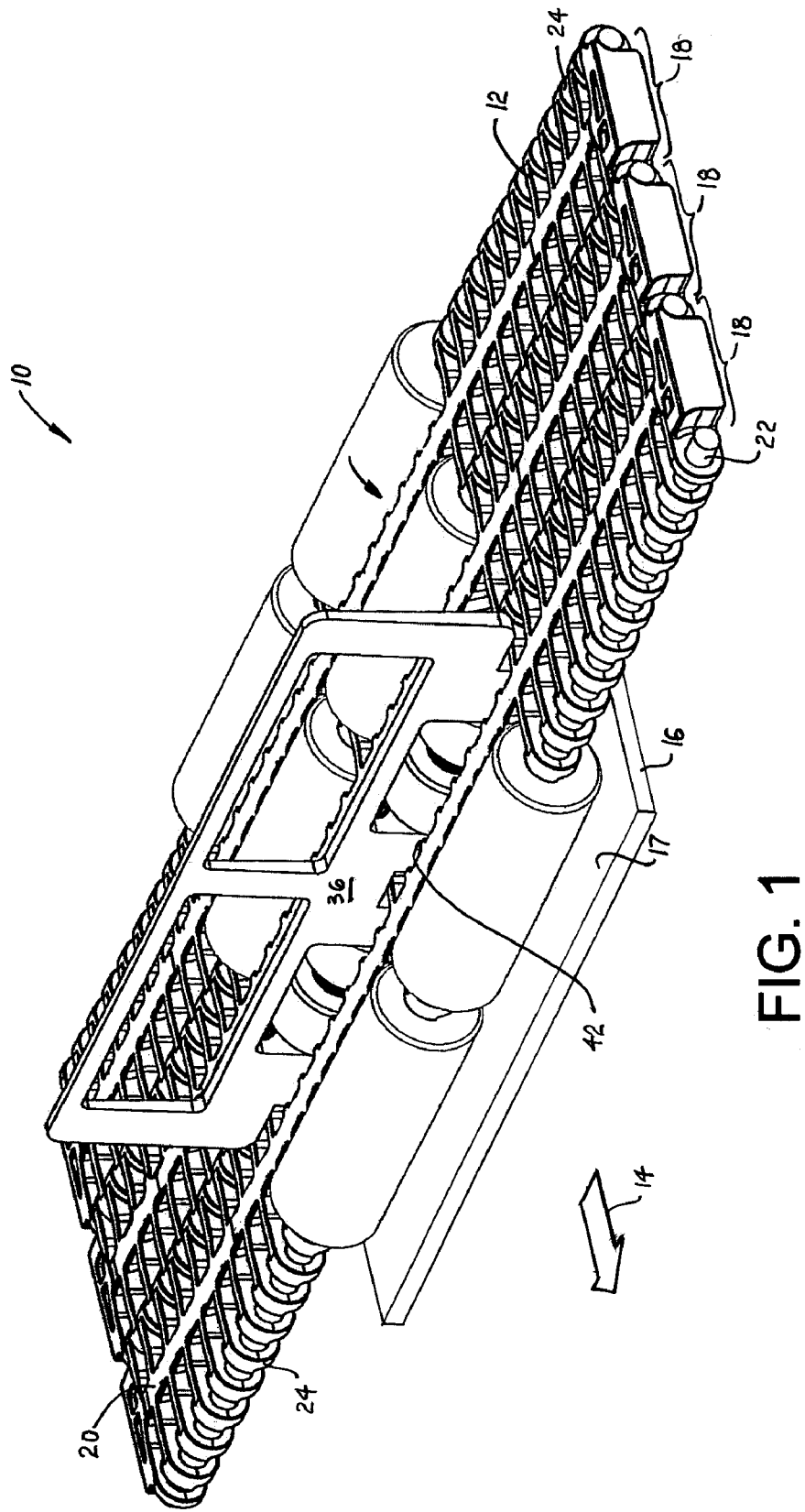
FIG. 1 is an axonometric view of a portion of a conveyor embodying features of the invention, including a clutch-driven flight in an extended position.

A portion of a conveyor embodying features of the invention is shown in FIGS. 1, 2, 3A, and 3B. The conveyor 10 comprises a conveyor belt 12 driven in a direction of belt travel 14 along a carryway that includes a support plate 16 having an upper engagement surface 17. The conveyor belt may be a flat belt, but is preferably a modular plastic conveyor belt constructed of a series of rows 18 of one or more side-by-side injection-molded thermoplastic modules 20 linked together by hinge rods 22 through interleaved hinge elements 24 along leading and trailing ends of each row. The belt extends in thickness from a top outer surface 26 to an opposite inner surface 27.

Some of the hinge elements along one end of some of the belt modules are missing to provide openings 28 for article-accelerating rollers 30 or clutch wheels 32. The support plate 16 supports the conveyor belt on the carryway and provides an engagement surface 17 on which the article-accelerating rollers can roll as the conveyor belt advances. Articles 34 supported atop the rollers 30 are accelerated forward along the belt by rotation of the rollers until the articles contact the flight 36 in an extended position blocking their further advance, as in FIGS. 1 and 3A. The positions of the flights on the belt define relative registered positions along the length of the belt that can be used to set precise spacings between consecutive conveyed articles, such as for a pre-merge conveyor used to prevent collisions between merging articles.

Figure 2:
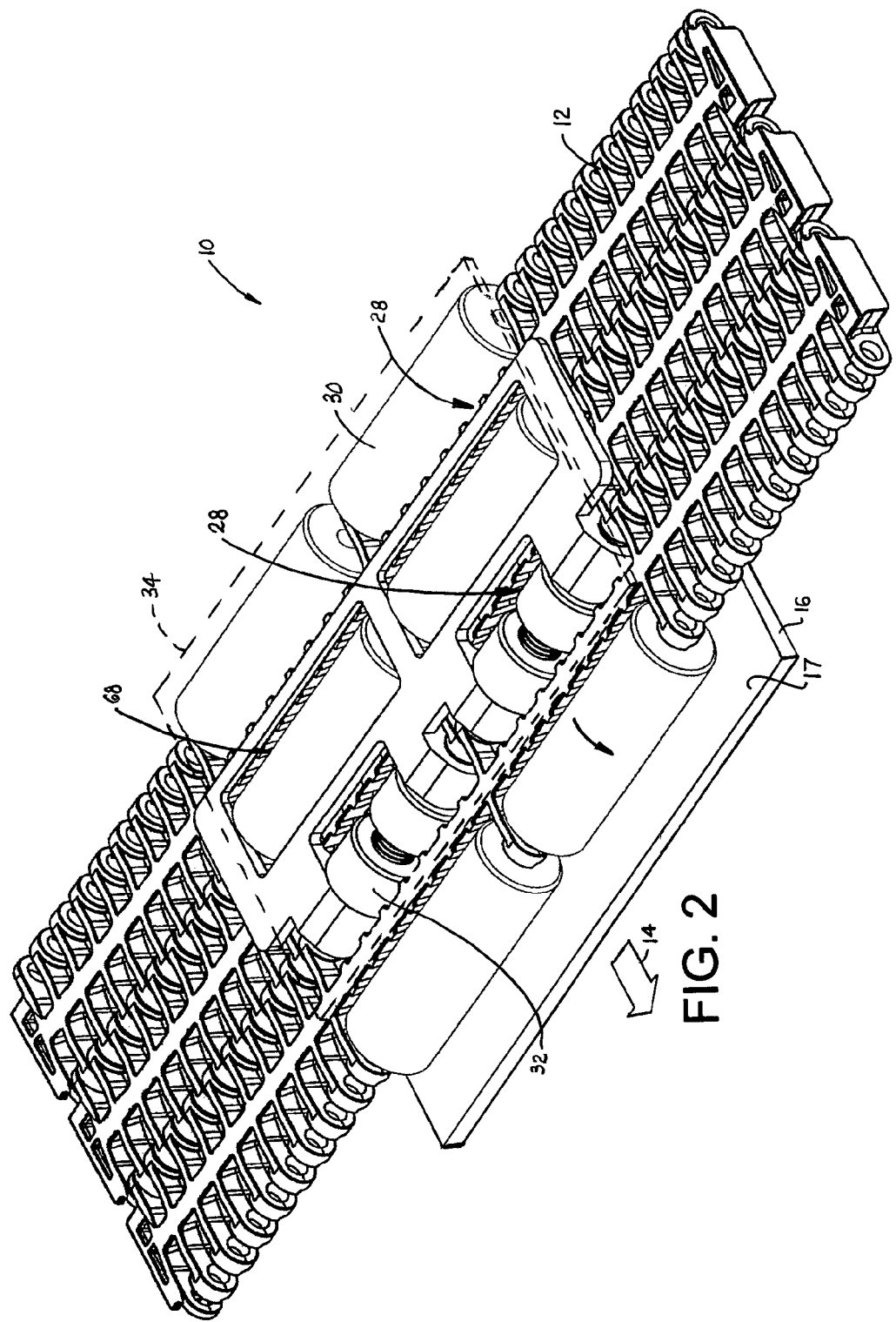
FIG. 2 is an axonometric view of the conveyor in FIG. 1 from a slightly different perspective showing the flight in a retracted position.
Figure 3A:
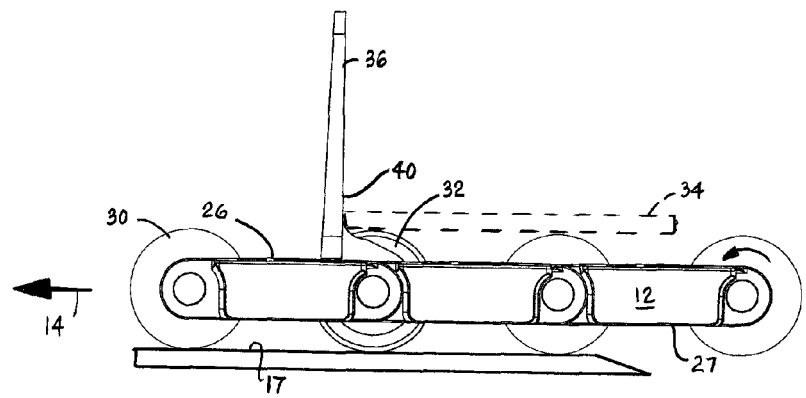
FIG. 3A is a side elevation view of the conveyor of FIG. 1.
Figure 3B:
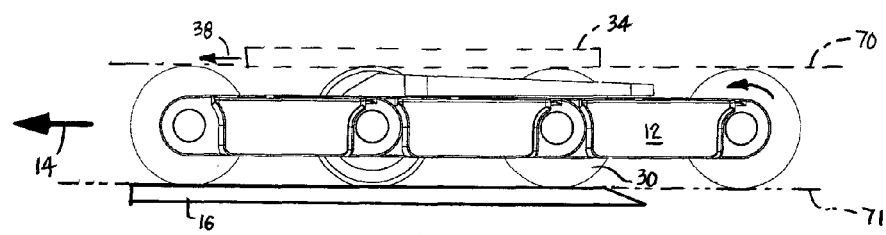
FIG. 3B is a side elevation view of the conveyor of FIG. 2.

The flight 36 rotates from a retracted position as shown in FIGS. 2 and 3B, to an extended position (FIGS. 1 and 3A). In the retracted position, the flight rests atop the outer conveying surface 26 of the belt, generally parallel to the direction of belt travel 14. In this non-blocking position, articles are propelled forward by rotation of the belt rollers 30 rolling on the engagement surface 17. In the extended position, the flight stands up from the outer belt surface in an article-blocking position with a rear edge 40 of the flight serving as a registration surface. Intermediate structure 42 in the belt module forms a stop past which the flight cannot rotate. In this example, the flight can rotate over a limited angular range of about 90° between the retracted and extended positions. But, in other applications, the intermediate structure and the flight could be structured to allow the flight to rotate through a range of less than 90° or a range up to as much as 180°.

Figure 4:
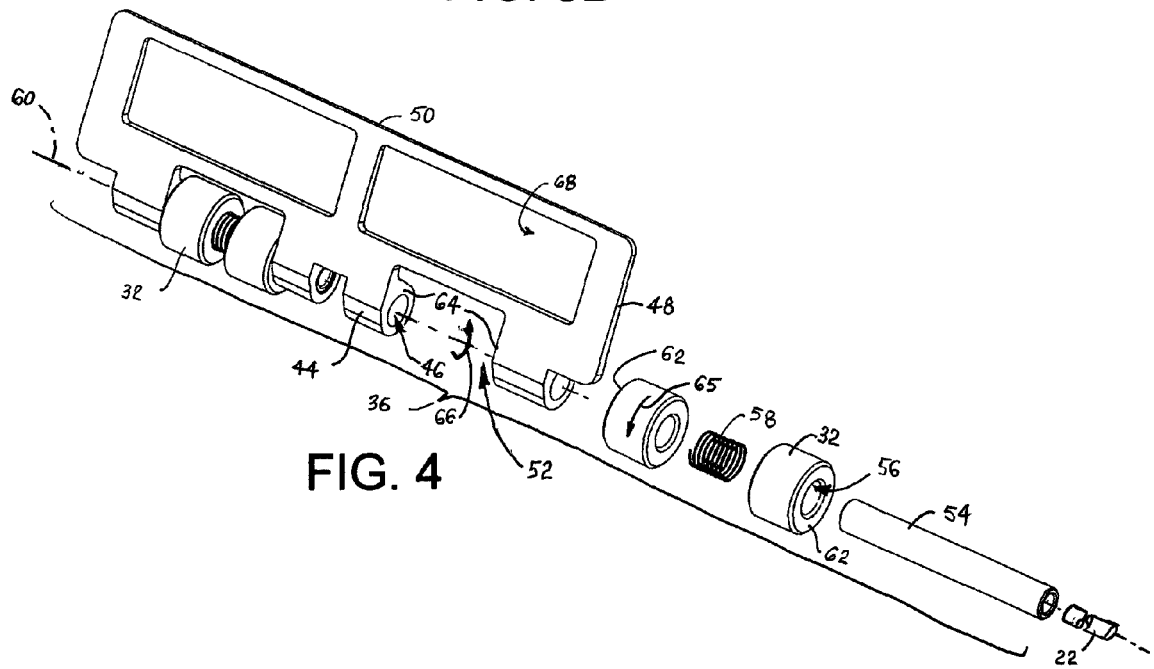
FIG. 4 is a partly exploded view of the clutch-driven flight in the conveyor belt in FIG. 1.

Details of the flight are shown in more detail in FIG. 4. The flight 36 comprises four pivot members 44 having aligned bores 46. A projection 48 extends outward from the flight to a top edge 50. The projection is shown as a thin, generally rectangular structure whose rear edge 40 defines a registration position on the belt. The flight is preferably made of a lightweight material such as plastic. The pivot members are grouped in two pairs on opposite lateral halves of the flight. A gap 52 is formed between the pivot members of each pair. A bushing, or sleeve 54, preferably made of stainless steel, is inserted into the bore of the outside pivot member, through a bore 56 in one of the wheels 32, through the center of a coil spring 58, through the bore of another wheel, and into the bore of the inside pivot member. The outer diameter of the sleeve is slightly greater than the nominal inside diameter of the bores in the pivot members so that the sleeve is retained firmly at each end in the pivot members in a press fit. The inside diameter of the bores in the wheels is slightly greater than the outside diameter of the sleeve so that they can rotate on the sleeve. The coil spring serves as one means for biasing the wheels against corresponding pivot members. An axle, in this example, one of the belt's hinge rods 22, is received in the sleeve and defines an axis of rotation 60 transverse, preferably perpendicular, to the direction of belt travel. The pivot members, the wheels, and the coil spring are all coaxially aligned along that axis.

The spring-loaded wheels engage the pivot members in a clutch arrangement. The wheels have flat driving faces 62 on the sides of the wheels opposite the spring. The driving faces are pushed against driven faces 64 on corresponding confronting sides of the pivot members. As the belt advances on the carryway, rotation of the wheels 65 rubbing against the pivot members imparts a moment 66 about the axis of rotation on the pivot members that rotates a flight unencumbered by a conveyed article or the stop 42 to the extended position. When the flight is weighted down by a conveyed article or reaches the stop and is hindered from rotating, the driving faces of the clutch wheels slip on the driven faces of the pivot members. The total friction between the wheels and the pivot members can be increased or decreased by adjusting the tension in the spring, changing the contact area between the driving and the driven faces, or changing the materials out of which the wheels and the flight are made to adjust the coefficient of friction.

In a preferred mode of operation, as the flights return to the carryway around an idle sprocket (not shown), they are gravitationally returned to their retracted state while running upside down along the returnway. Until the clutch wheels 32 reach the engagement surface 17, the flights remain retracted. If an article 34, even a lightweight article, is atop a flight above the engagement surface, the flight does not pop up because the low torque produced by the clutch mechanism is insufficient to overcome the load and rotate the flight. (Of course, as already mentioned, the amount of torque may be set to a predetermined level to meet other operating requirements.) The wheels slip on the pivot members of the flight until the article is propelled forward past the flight by contact with the rotating rollers 30 and the clutch wheels 32. Windows 68 are provided in the flight projections to clear the belt rollers when the flight is retracted. The diameter of the clutch wheels and the rollers is preferably equal so that their salient portions extending above and below the belt define common planes—an article-supporting plane 70 on top and a plane containing the engagement surface 17 along the carryway—parallel to the conveying surface of the belt. And the diameter of the clutch wheels exceeds the diameter of the pivot members so that the wheels extend above the level of the retracted flight into position to accelerate conveyed articles. Thus, both the rollers and the clutch wheels can be activated by contact with the same engagement surface and can also be used to propel conveyed articles forward.

Although the invention has been described in detail with respect to a preferred version, other versions are possible. For example, both the clutch wheels and the belt rollers are shown rotating on hinge rods. But they could rotate on other axles in the belt not serving as hinge rods. As another example, the flight could be rotated through an angular range other than 90° between retracted and extended positions. And the clutch-driven flights may serve different purposes and be shaped differently from those described. Furthermore, the clutch-driven flight works on belts without article-accelerating rollers. So, as these few examples suggest, the scope of the claims is not to be limited to the preferred versions.

What is claimed is:

1. A conveyor belt comprising:
   a flight rotatably coupled to the conveyor belt and having a driven face;
   a clutch mechanism rotatably coupled to the conveyor belt and having a driving face;
   wherein the driving face is biased in contact with the driven face to rotate the flight from a first position to a second position as the clutch mechanism is rotated by contact with an engagement surface external to the conveyor belt while the conveyor belt advances in a direction of belt travel.

2. A conveyor belt as in claim 1 wherein the clutch mechanism includes at least one clutch wheel extending through the thickness of the conveyor belt and rotatable on an axis transverse to the direction of belt travel and forming the driving face on one side.

3. A conveyor belt as in claim 1 wherein the flight in the first position is in a retracted position generally parallel to the direction of belt travel and wherein the flight in the second position is in an extended position upstanding from the conveyor belt.

4. A conveyor belt as in claim 1 wherein the clutch mechanism includes a spring biasing the driving face against the driven face.

5. A conveyor belt as in claim 1 wherein the driving face is biased against the driven face with a force low enough to allow the two faces to slip relative to each other when the flight is loaded beyond a predetermined amount.

6. A conveyor belt comprising:
   upper and lower outer surfaces;
   a flight having a pivot member rotatable over a limited angular range about an axis transverse to a direction of belt travel and a projection that rotates from a retracted position generally parallel to the upper outer surface to an extended position upstanding from the upper outer surface by rotation of the pivot member over the angular range;
   a clutch mechanism mechanically coupled to the flight to induce a moment on the flight about the axis directed to rotate the projection from the retracted position to the extended position as the conveyor belt advances in the direction of belt travel;
   wherein the clutch mechanism includes:
      a clutch wheel disposed coaxially with the pivot member; and
      biasing means pushing the clutch wheel into contact with the pivot member.

7. A conveyor belt as in claim 6 wherein the biasing means comprises a coil spring coaxially aligned with the clutch wheel and the pivot member.

8. A conveyor belt as in claim 6 wherein the biasing means pushes the clutch wheel against the pivot member with a force sufficient for the clutch wheel to rotate the flight from the retracted position to the extended position only when a conveyed article is not atop the retracted flight.

9. A conveyor belt as in claim 6 wherein the clutch wheel has a driving face and the pivot member has a driven face confronting the driving face and the biasing means pushes the driving face into contact with the driven face.

10. A conveyor as in claim 9 wherein the area of the driving face is greater than the area of the driven face.

11. A conveyor belt as in claim 6 wherein the pivot member and the clutch wheel each have aligned bores and the conveyor belt further comprises an axle defining the axis disposed perpendicular to the direction of belt travel and received in the bores.

12. A conveyor belt as in claim 6 wherein the flight comprises a pair of pivot members each having a bore coaxial with and spaced from each other across a gap and wherein the conveyor belt further comprises a sleeve received in the bores and spanning the gap, wherein the clutch wheel is rotatably mounted on the sleeve.

13. A conveyor belt as in claim 12 comprising a pair of clutch wheels rotatably mounted on the sleeve in the gap and wherein the biasing means comprises a coil spring mounted on the sleeve between the pair of clutch wheels to bias the clutch wheels away from each other into contact with the pivot members.

14. A conveyor belt as in claim 12 further comprising an axle received in the sleeve and defining the axis about which the flight and the clutch wheel rotate.

15. A conveyor belt as in claim 6 wherein salient portions of the clutch wheel extend through the thickness of the conveyor belt past the upper and lower outer surfaces of the belt.

16. A conveyor belt as in claim 6 further comprising a series of rows of belt modules linked together by hinge rods at hinge joints between consecutive rows and wherein the flight and the clutch wheel rotate about one of the hinge rods.

17. A conveyor belt as in claim 6 further comprising rollers disposed in the belt arranged to rotate on axes transverse to the direction of belt travel wherein the rollers and the clutch wheel have the same diameter.

18. A conveyor belt as in claim 17 wherein the projection has windows therethrough to accommodate and avoid contact with the rollers when the flight is in the retracted position.

19. A conveyor belt as in claim 6 wherein the clutch wheel has a greater diameter than the first pivot member.

20. A conveyor comprising:
   a conveyor belt having upper and lower outer surfaces arranged to advance in a direction of belt travel;
   an engagement surface below the conveyor belt;
   a flight coupled to the conveyor belt, the flight having a pivot member rotatable over a limited angular range about an axis transverse to the direction of belt travel and a projection that rotates from a retracted position generally parallel to the upper outer surface to an extended position upstanding from the upper outer surface by rotation of the pivot member over the angular range;
   a clutch mechanism mechanically coupled to the flight and rotated by contact with the engagement surface as the conveyor belt advances in the direction of belt travel to induce a moment on the flight about the axis directed to rotate the projection from the retracted position to the extended position;
   wherein the clutch mechanism includes:
      a clutch wheel disposed coaxially with the pivot member and arranged to roll on the engagement surface; and
      biasing means pushing the clutch wheel into contact with the pivot member.

21. A conveyor as in claim 20 wherein the clutch wheel has a driving face and the pivot member has a driven face confronting the driving face and the biasing means pushes the driving face into contact with the driven face.

22. A conveyor as in claim 21 wherein the driving face slips on the driven face of the flight in the extended position or when the flight in the retracted position is weighted down by a conveyed article as the wheel rotates in contact with the engagement surface as the belt advances in the direction of belt travel.

23. A conveyor as in claim 20 wherein the clutch mechanism pushes against the pivot member of the flight with a force sufficient to rotate the flight from the retracted position to the extended position only when the flight, while retracted, is not weighted down by a conveyed article.

24. A conveyor as in claim 20 wherein the biasing means comprises a coil spring positioned to push the driving face against the driven face.

25. A modular conveyor belt comprising:
   a series of rows of one or more side-by-side conveyor belt modules linked end to end by hinge rods through interleaved hinge elements of consecutive rows into an endless belt having an outer surface and an opposite inner surface and openings extending from the inner surface to the outer surface;
   one or more flights rotatably attached to the modular conveyor belt in the openings and adapted to be rotated from a retracted position resting atop the outer surface of the belt to an extended position upstanding from the belt;
   one or more wheels rotatably attached to the modular conveyor belt in the opening with a salient portion of the wheel extending from the opening past the inner surface of the belt;
   wherein the flights include pivot members having driven faces and the wheels include driving faces biased against the driven faces to form a clutch that allows the driving faces of the wheels when rotating to apply a moment directed to rotate the flights from the retracted position to the extended position when unencumbered and to slip on the driven faces of the pivot members when the flights are encumbered.

26. A modular conveyor belt as in claim 25 wherein the pivot members of the flights and the associated wheels rotate about the hinge rods.

27. A modular conveyor belt as in claim 25 further comprising a spring in each clutch and wherein each flight includes at least one pair of pivot members separated by a gap and wherein a pair of wheels are disposed in the gap separated by the spring pushing the wheels apart so that the driving face of each wheel contacts the driven face of each pivot member.

28. A modular conveyor belt as in claim 25 further comprising rollers rotatably mounted in the belt to rotate on axes transverse to the direction of belt travel wherein salient portions of the rollers and the wheels extend the same distance past the outer and inner surfaces of the belt.

\* \* \* \* \*